No. 783,696. PATENTED FEB. 28, 1905.
I. KITSEE.
INDICATING LEAKS IN ELECTRIC CONDUCTORS.
APPLICATION FILED JUNE 5, 1902.
3 SHEETS—SHEET 1.
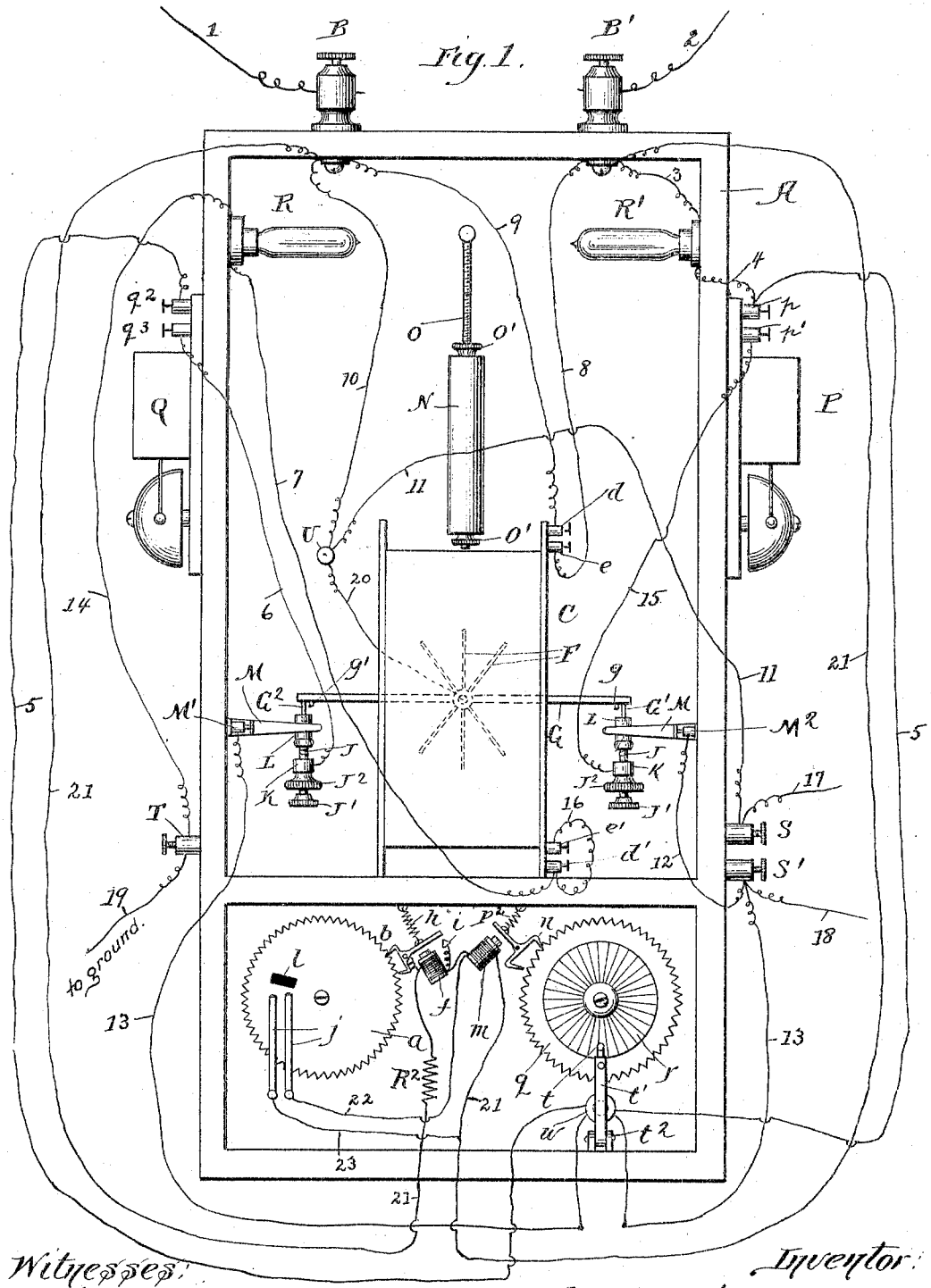

No. 783,696. PATENTED FEB. 28, 1905.
I. KITSEE.
INDICATING LEAKS IN ELECTRIC CONDUCTORS.
APPLICATION FILED JUNE 5, 1902.
3 SHEETS—SHEET 2.
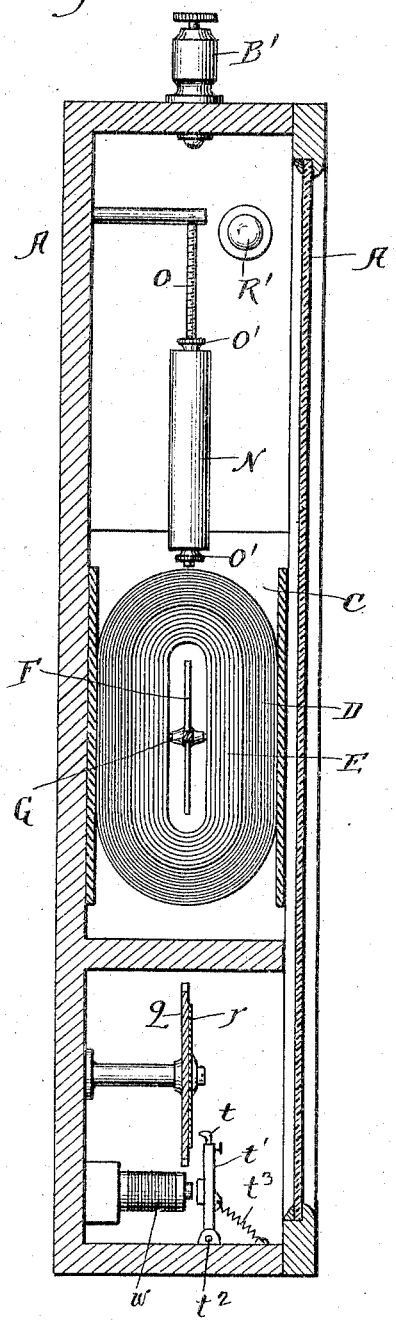
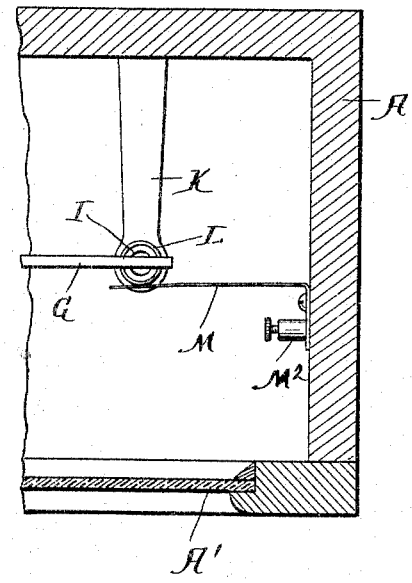
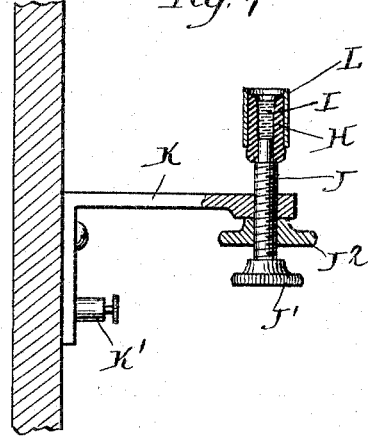
Witnesses:
H. B. Hallock
E. R. Stilley
Inventor:
Isidor Kitsee No. 783,696. PATENTED FEB. 28, 1905.
I. KITSEE.
INDICATING LEAKS IN ELECTRIC CONDUCTORS.
APPLICATION FILED JUNE 5, 1902.

3 SHEETS—SHEET 3.

Witnesses:
H. B. Hallock.
E. R. Stilley

Inventor.

No. 783,696.

Patented February 28, 1905.

UNITED STATES PATENT OFFICE.

ISIDOR KITSEE, OF PHILADELPHIA, PENNSYLVANIA.

INDICATING LEAKS IN ELECTRIC CONDUCTORS.

SPECIFICATION forming part of Letters Patent No. 783,696, dated February 28, 1905.

Application filed June 5, 1902. Serial No. 110,335.

*To all whom it may concern:*

Be it known that I, ISIDOR KITSEE, of the city and county of Philadelphia, State of Pennsylvania, have invented certain new and useful Improvements in Indicating Leaks in Electric Conductors, (Case No. 126,) of which the following is a specification.

My invention relates to an improvement in automatically indicating leaks in electric circuits.

The object of my invention is to provide means whereby defects in the circuit may easily be detected.

It frequently happens that the wiring in dwellings and stores becomes defective. In most cases the insulation breaks down in time, and through the escape of the current frequent fires occur. Often the conductor itself becomes heated, either through a greater flow of current or through the change of molecules, whereby the brittleness of the conductor increases, and this again in time may lead to accidents. In short, conflagrations due to electric wires in dwellings, as well as stores, are not a very infrequent occurrence, and it would be of the utmost importance to detect any defects in the insulation of the circuit before the danger-point is reached.

The aim of my invention is to provide means for such protection.

The insulation of the wiring does not break down entirely at once; but it often takes months and even years before the breaking down of the circuit has reached such a point that a conflagration is the result. It often happens that through defective insulation small leaks occur, which slowly carbonize the nearby woodwork, and this carbonization goes on for a great length of time till at last the point is reached where combustion takes place.

It is therefore the aim of my invention to notify the person in charge that the insulation at one or the other point is defective and also to automatically cut off the supply of current from such defective circuits when the danger-point is reached.

It is also the object of my invention to record the status of the circuit during a certain period.

Figure 5:
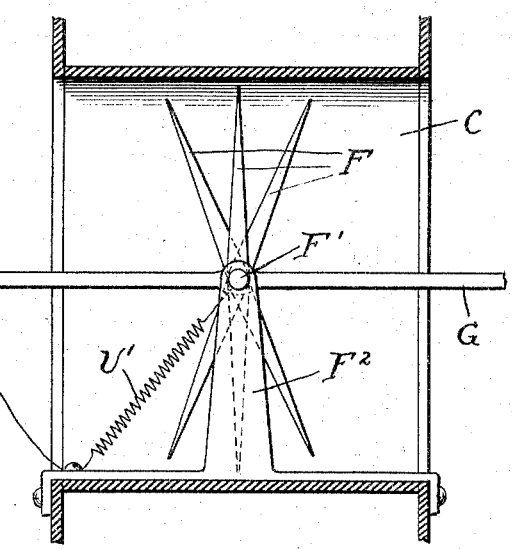
Figure 6:
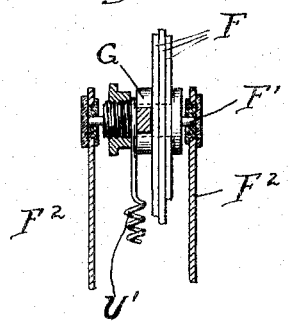

Referring to the drawings, Figure 1 is a front elevation of the leak-detector, showing the door removed. Fig. 2 is a vertical central longitudinal section through the apparatus. Fig. 3 is an enlarged plan view of the mercury contact-cup. Fig. 4 is an enlarged vertical section through the mercury contact-cup. Fig. 5 is a vertical longitudinal section of the support for the coils, showing the needles and their electrical connection. Fig. 6 is an enlarged detailed section through the needles and their pivot.

A is the casing, access being gained to the interior through the glass-paneled door A'.

B and B' are the main binding-posts, which are connected, respectively, to the main circuits 1 and 2.

C is a support for the two coils D and E. In the center of the coils is pivoted the three-part needle F, and connected to this needle is the contact-bar G, which is provided upon each outer end with contact-pins G' and G$^2$. $g$ and $g'$ are two contact-points also secured to each outer end of the bar G.

H is a rubber cup containing the mercury I, in which the contact-pins G' and G$^2$ are adapted to dip as the bar G is oscillated by the movement of the needles. This rubber cup H is supported upon the end of a screw J, which screw is threaded through a bracket K, and this bracket extends upward from the rear of the casing A.

J' is a milled thumb-nut upon the lower end of the screw J for the purpose of adjusting the same, and J$^2$ is a lock-nut for binding the same in place after being once adjusted.

L is a metallic sleeve upon the outside of the rubber cup with which the small contact-points $g$ and $g'$ are adapted to come in contact with when the bar is oscillated to a greater degree.

M represents springs located upon each side of the casing, of which one is adapted to be constantly in contact with one of the sleeves L. These springs M are secured to the sides of the casing, and one is connected with the binding-post M' and the other with the binding-post M$^2$.

N is a permanent magnet arranged above the coils and is threaded upon and secured to rod O, which is suspended through the case.

This magnet may be adjusted along the rod O and secured in place by means of the nuts O' upon each side of the rod O.

P is a bell located upon one side of the casing, and Q is another bell located upon the opposite side of the casing and having a different tone.

R and R' are electric lamps located on opposite sides of the casing.

S and S' are the binding-posts from which the wires 17 and 18 extend to a suitable cut-out device.

T is a binding-post from which the wire 19 extends to the ground.

U is a binding-post which is employed for the purpose of connecting the wires 10, 11, and 20.

The two circuit-wires to be protected are through wires 1 and 2, connected with the binding-posts B and B', respectively. The binding-post B is through wire 9 in electrical contact with the binding-post $d$, which binding-post is the terminal of the wire of the coil D. The other terminal of this coil is connected to the binding-post $d'$. The binding-post B' is through wire 8 in electrical contact with the binding-post $e$, which is the terminal of the wire of the coil E, the other terminal of which is connected to the binding-post $e'$. Both these binding-posts $d'$ and $e'$ are in electrical contact with each other through wire 16. The two coils D and E are adjusted to each other and to the needle in such a manner so that the wires of one coil exert the same degree of influence on the needle as the wires of the other coil, and as the flow of the current in one coil is opposite to the flow of the current in the other and as both coils are electrically connected at one terminal it follows that the combined influence of the needle is zero. The combined binding-posts $d'$ and $e'$ are through wire 7, lamp R, wire 14, binding-post T, and wire 19, connected to the ground. The arm G is through spring U' and wire 20 in electrical contact with the binding-post U, and this binding-post is in electrical contact with the main binding-post B and through the same with one of the circuit-wires carrying the current.

The terminals of the electromagnetic coil of the bell P are connected to the binding-posts $p$ and $p'$, respectively. The binding-post $p$ is through wire 4, lamp R', and wire 3 connected with the main binding-post B', and therefore with the current-carrying circuit-wire 2. The binding-post $p'$ is through wire 15 and bracket K in electrical contact with the mercury I, contained in the rubber cup H, and as the binding-post U, which is in electrical connection with the bar G, is also in electrical connection through wire 10 with the other current-carrying circuit-wire 1 it follows that if contact G' in electrical contact with the bar G contacts with the mercury in electrical connection through bracket K with the wire 15 a circuit is established, including the following elements: electromagnet of the bell P, lamp R', wire 2 of the main circuit, source of electric current connected to said wire 2 (said source not illustrated) to wire 1, wire 10, wire 20, bar G, and contact G'. The bell P will thereby be actuated and sound the alarm. The terminals of the electromagnet of the bell Q are connected to the binding-posts $q^2$ and $q^3$, respectively, and as the binding-post $q^2$ is connected, through wire 5, wire 4, lamp R', wire 3, binding-post B', with the wire 2 of the current-carrying circuit and as the binding-post $q^3$ is connected, through wire 6 of the left-hand bracket K, supporting also the mercury cup H, it follows that if the contact $G^2$ on the left-hand end of the bar G contacts with the mercury in said cup a circuit will be established consisting of the following elements: electromagnet of the bell Q, wires 5 and 4, lamp R', wire 3, wire 2 of the current-carrying circuit, source of electricity, (not illustrated,) wire 1, wire 10, wire 20, bar G, contact $G^2$, bracket K, and wire 6. The bell Q will thereby be actuated and sound the alarm.

The right-hand spring M is in electrical connection with the binding-post $M^2$ and through wire 12 with binding-post S', and as this binding-post is supposed to be connected to one terminal of the electromagnetic device actuating the cut-out, the other terminal of which is connected to wire 17 with the binding-post S, and as the binding-post S is connected, through wires 11 and 20, with the bar G it follows that as soon as contact-point $g$ contacts with the outer metallic sleeve L a circuit is established containing the cut-out, which circuit consists of the following element: coil of electromagnetic device designed to open the magnetic cut-out device, wire 17, wire 11, wire 20, bar G, contact-point $g$, sleeve L, contact-spring M, wire 12, wire 18 to opposite terminal of the electromagnetic cut-out. The electromagnetic cut-out device will be actuated and the circuit will be broken as soon as said point $g$ will come in contact with the sleeve L and when the contact $g'$ connects with the left-hand sleeve L, left-hand spring M, wire 13, wire 18, electromagnetic cut-out device, wire 17, wire 11, wire 20, and bar G.

In a separate compartment in the drawing shown below the main apparatus is the toothed wheel $a$, journaled independently in any suitable manner to the casing A, the same being adapted to be operated by a step-by-step movement consisting of an escapement $b$, which escapement is operated in one direction by electromagnet $f$, connected through wire 21 with the main circuit.

$i$ is a contact-point adapted to form a contact with the armature of the escapement $b$ when said escapement is attracted toward the magnet $f$. One terminal of the coil of this electromagnet $f$ is electrically connected to the escapement $b$, and the other terminal of the coil is electrically connected to the contact-point $i$. Thus when the armature of the escapement is attracted toward the magnet a contact will be made with the contact $i$ and the magnet $f$ will be short-circuited, and thereby deënergized, allowing the spring $h$ to act in a manner so as to draw the armature of the escapement away from the magnet, and thus actuate the wheel one tooth.

$j$ represents two springs in contact with the conducting-surface of the wheel $a$, and carried by this wheel is a non-conducting strip $l$.

$q$ is a second toothed wheel adapted to be revolved by a second step-by-step movement consisting of the escapement $n$ and the magnet $m$. This magnet is included in the circuit formed by the wire 21, and this magnet is also normally short-circuited by means of the wires 22 and 23, connected to contact-spring $j$; but when said contact-springs are electrically disconnected from each other by the insulating-strip $l$ the shunt is broken, the magnet $m$ energized, and the armature of the escapement $n$ attracted toward the magnet and held in such position till the springs pass off of the non-conducting strip $l$, deënergizing the magnet and allowing the spring $p^2$ to act in such manner as to return the escapement to its normal position, where it is held till the non-conducting strip $l$ has made a complete revolution.

Secured to the toothed wheel $q$ is the registering-disk $r$, divided by lines to indicate different durations of time—such as hours, days, &c.—and $t$ is an inking or pencil point arranged about or in front of the disk $r$ and normally out of contact with the same. This point $t$ is held within a pivoted arm $t'$, pivoted to the casing $t^2$, and this arm forms the armature for the electromagnet $w$, which electromagnet is included in a circuit formed by the wire 5, being the common return for the circuit including the alarm devices P and Q. Thus when either of the bells are sounded the magnet $w$ will be energized, so as to bring the pencil-point $t$ in contact with the indicating-disk $r$, and as the disk is revolved a line will be drawn by the pencil-point upon the disk as long as the circuit is closed, thus indicating the duration of the leak. As soon as the line has been repaired this circuit will be broken through the returning of the needle to its normal position, and thus the magnet $w$ will be demagnetized and will cause the spring $t^3$ to act in such manner as to return the pencil-point to its normal position.

The *modus operandi* of practicing this my invention is as follows: When installing the device, one of the main-line wires is connected to the binding-post B and the other of the main-line wires is connected to the binding-post B'. In practice the employee of the fire underwriters, such as an inspector, should first through artificial means ascertain to what height the cups should be screwed, so that the needles when deflected should contact with the mercury in same through the conducting-arm, because it is one of the greatest advantages of the device as illustrated that it lies in the power of the person in charge of the instrument to so adjust the same that the signals announcing a leakage should only be given at a predetermined leakage of the current. In some cases, specially where moisture is present, a very slight leak is normal, and the mercury contents of the cups should therefore not electrically contact with the arm if this slight leak is present, but should only contact if this leak is increased above the normal. The person in charge of the instrument therefore should at the time of installation carefully adjust the cups to the required height and then test what amount of leakage is necessary to deflect the needles so as to come in contact and ring the bells. I consider this arrangement of the greatest importance, for the reason that through this adjustment the flexibility of the device is such as to allow its employment under all conditions.

It was noted in the description of the drawings that each of the annunciating devices (bells) are adapted to give a different tone, this for the reason that the attendant should know if the defective insulation is on the positive or negative line-wire.

As was clearly set forth in the description of the drawings, I have provided the contact-arm on each side with two contact-points, one contact-point coming into action when the leak present is abnormal but yet not immediately dangerous, and this contact is designed only to actuate the annunciating-bells. The second contact-point should come into operation only when the leak has assumed such proportions that imminent danger from same is threatened, and this contact is designed to close a circuit containing an electromagnetic device whereby a cut-out or switch shall be actuated in a manner so as to open the circuit entirely. This precaution is necessary, as such leakage may occur at a time when the proper person to adjust a leak is not present at the station.

The instrument from which this description was taken has a combined resistance of seven thousand nine hundred and seventy-two ohms 22° centigrade and gives a deflection if a resistance of two hundred and seventy thousand ohms is thrown into the ground-circuit; but after careful trials it was found that it is best to adjust the cups in such manner that the bells will only ring if the resistance between the current-carrying circuit and the ground is reduced to one hundred and ten thousand ohms. The second contact—that is, the contact adapted to actuate the cut-out or switch—was made to effectually contact only if the ground resistance is lowered to about four hundred and twenty ohms, the electromotive force of the circuit carrying the current being, as usual, one hundred and ten to one hundred and twenty volts.

From the description of the drawings it is clearly seen that the dials are adapted to be actuated by electromagnetic means. These means are illustrated by a simple step-by-step movement; but it is obvious that any of the well-known electromagnetic means may be substituted. This step-by-step movement should have such relation as to one of the dials as to cause the same to make one revolution about every hour, and the dial with the record-sheet, which is moved one tooth for every revolution of the first dial, should be of such dimension and should have so many teeth that one complete revolution should only be accomplished after about one month or such period as will lapse between two inspections, for it is proposed that the inspector of the fire underwriters having the device installed, the screws set in a manner so that the bells should only ring after a predetermined leakage occurs, and the cut-out or switch be only opened after a predetermined stronger leakage has occurred, shall lock and seal the casing, so that tampering with the inner parts of the device shall not be permissible. It is also proposed that through the recording device the inspector shall be able to find out for how many hours during the time from one inspection to the next following the instrument was in use, how often during this time leaks occurred, and the duration of each of these leaks.

Coming now to Figs. 5 and 6, in which C is the non-conducting support for the coils, F represents the needles, F' the needle-shaft, G the arm, F² the support for the needle-shaft, U' the conducting-spring for the purpose of making connection between the arm G and wire 20, it shall be noted that these needles F are composed of three separate needles, each pivoted on a common shaft in a manner so that the points of same are at an angle of about forty degrees from each other. Long and careful experiments have brought about this arrangement, as it was found impossible to make an instrument based on the principle of a galvanometer with only one needle or with a series of needles one above the other, the poles of each pointing in exactly the same direction. Through the arrangement as described a stability of the instrument is attained otherwise impossible to attain, besides the fact that the sensibility of the instrument is greatly increased. I therefore believe that the arrangement of placing the needles so that their extreme points are at angles to each other is necessary in an instrument adapted for the purpose as specified.

In another application I will describe a modification whereby different parts of the circuit to be protected are automatically tested at different times and automatically cut out if the danger-point is reached.

I have illustrated each part of the recording device as to consist of one many-toothed dial; but it is obvious that a series of dials with reducing-gears may be substituted, and where space is of great importance it is preferred that the dials themselves should be of comparatively small diameter and a series of them be employed instead of one large dial, as illustrated in the drawings.

Having now described my invention, what I claim as new, and desire to secure by Letters Patent, is—

1. A galvanometer, a series of needles secured to a common shaft in a manner so that their points are at angles to each other, said needles placed in the recess of the coil of said galvanometer.

2. A galvanometer, consisting of the following instrumentalities: a coil provided with a recess, three needles connected to a common shaft in a manner so that their points are at angles to each other, said shaft placed in the recess of said coil.

3. A galvanometer consisting of the coil proper, a series of magnetic needles pivotally connected to a common shaft, the alike poles of said needles at an angle of about forty degrees to each other, said magnetic needles placed in the recess of said coil.

4. In a device of the class described, two stationary coils, movable magnets for said coils, a conducting-arm connected to said movable magnets, contact-points secured to said movable arm, and adjustable cups in operative relation to said contact-points, said stationary coils provided with means to connect one terminal of each of said coils to one line-wire of the circuit to be protected, and to connect the other terminal of each of said coils electrically with each other and to the ground.

5. In a device of the class described, a stationary coil, movable magnets in proximity to said coil, a conducting-arm connected to said movable magnets, said conducting-arm provided on each of its ends with two contact-points, differing in length from each other, one contact-point adapted to close a circuit at one deflection of the arm and the second contact-point adapted to close a circuit at a second and greater deflection of said arm; the first-named circuit embracing an annunciating device and the second-named circuit embracing a second annunciating device and a device adapted to disrupt the circuit to be protected.

6. In a device of the class described, an adjustable contact, said adjustable contact consisting of two conducting parts electrically separated from each other, one conducting part consisting of a liquid conductor and one conducting part consisting of a solid conductor.

7. In a device of the class described, two stationary coils connected each with one terminal to the circuit to be protected and connected each with one terminal to the ground, movable magnets contained in the recess of said coils, a conducting-arm secured to said movable magnets, an electrical connection between said arm and part of the circuit to be protected, one or more contact-points on each end of said arm, adjustable contacts in proximity to said contact-points, each of said adjustable contacts in electrical connection with an alarm device, the tone of the alarm device connected to one adjustable contact differing from the tone of the alarm device connected to the other of said adjustable contacts.

8. In a device of the class described, means to actuate an alarm device at one deflection of the needles included in said device, and means to break the current-carrying circuit at a second and greater deflection of said needles.

9. A device of the class described, consisting of the following instrumentalities: stationary coils formed with a recess connected to the circuit to be protected and ground respectively, movable magnets in the recess of said coils, a conducting-arm secured to said movable magnets, said conducting-arm in electrical contact with part of the circuit to be protected, contact point or points at or near the end of said conducting-arm, adjustable contacts in operative relation to said contact-points, each of said adjustable contacts electrically connected to an alarm device, the tones of which differ from each other.

10. A device of the class described, consisting of the following instrumentalities: stationary coils formed with a recess connected to the circuit to be protected and ground respectively, movable magnets in the recess of said coils, a conducting-arm secured to said movable magnets, said conducting-arm in electrical contact with part of the circuit to be protected, two contact-points on each end of said arm, the length of each of said two contacts differing from the other, adjustable contacts in proximity to each pair of said contact-points, said adjustable contact consisting of two parts, one part adapted to contact with one of said pair of contact-points, and the other part adapted to contact with the other of said pair of contact-points, one part of the adjustable contact electrically connected with the alarm device and the other part of said adjustable contact electrically connected with a device adapted to break the circuit to be protected.

11. In combination with a device of the class described, a telltale device consisting of electrically-actuated dials, a recording-sheet on one of said dials, recording means in operative relation to said dials, and electromagnetic means adapted to actuate said recording means, said electromagnetic means adapted to be operated through the closing of a circuit due to the leakage of the current, said closing due to the moving of a second dial.

12. In combination with a device adapted to detect leaks in electric circuits, electromagnetic means adapted to record said leaks, said electromagnetic means connected electrically to the circuit including annunciating means adapted to be brought into operation through a leakage in the circuit to be protected, said closing due to the moving of a second dial.

13. In a device of the class described, means to give audible alarm at a leakage of one degree and means to automatically cut off the current in the circuit to be protected at a leakage of a greater degree, and means to record the leakage and the duration of same.

14. In combination with a device of the class described, means to register the occurrence of a leak, means to register the time said leak exists, and means to automatically give warning of the existence of said leak.

15. In a device of the class described, means to give audible warning at the occurrence of a leakage in the circuit to be protected, means to register the occurrence of said leak, and means to automatically cut out the circuit if said leak assumes dangerous proportions.

In testimony whereof I hereby sign my name this 2d day of June, A. D. 1902.

ISIDOR KITSEE.

Witnesses:
 EDITH R. STILLEY,
 CHAS. KRESSENBUCH.